United States Patent [19]

Takeuchi

[11] Patent Number: 4,467,905
[45] Date of Patent: Aug. 28, 1984

[54] CLUTCH DISC

[75] Inventor: Hiroshi Takeuchi, Higashi-Osaka, Japan

[73] Assignee: Kabushiki Kaisha Daikin Seisakusho, Osaka, Japan

[21] Appl. No.: 367,984

[22] Filed: Apr. 13, 1982

[30] Foreign Application Priority Data

Apr. 20, 1981 [JP] Japan .................................. 56-59956

[51] Int. Cl.³ .............................................. F16D 3/64
[52] U.S. Cl. .............................. 192/106.2; 192/70.17; 192/106.1; 464/66; 464/81
[58] Field of Search .............. 192/70.17, 106.1, 106.2; 464/66, 69, 81, 82

[56] References Cited

U.S. PATENT DOCUMENTS 1,208,956 12/1916 Hallner ................................ 464/66
2,220,564 11/1940 Wood ................................ 192/106.2
4,377,386 3/1983 Hannibal ................................ 464/69

Primary Examiner—Rodney H. Bonck
Assistant Examiner—James J. Merek
Attorney, Agent, or Firm—Armstrong, Nikaido, Marmelstein & Kubovcik

[57] ABSTRACT

The present invention relates to a clutch disc suitable for vehicles. The clutch disc comprises a spline hub having a polygonal cam flange at its outer periphery; a clutch plate and a retaining plate arranged at both sides of the cam flange; lever pins fixing said both plates together with a space therebetween, said lever pins being positioned on a same circumference; levers supported by the lever pins at their intermediate portions respectively; rollers arranged at respective one ends of the levers; and torsion springs engaging with respective other ends of the levers so that the rollers may be pressed onto cam faces of the flange.

6 Claims, 4 Drawing Figures

CLUTCH DISC

BACKGROUND OF THE INVENTION

The present invention relates to a clutch disc suitable for vehicles and has as its objects to increase a maximum torsion angle and to facilitate various intended changes of torsion characteristic by modifying the shape and size of a few parts or members.

Attempts have been made to increase the maximum torsion angle of clutch discs to increase in order to lower vehicle noise. More concretely, in a graph of load-torsion angle characteristic line in which a vertical axis is load and a horizontal axis is torsion angle, incline of the characteristic line is required to be small while the angle increases from zero (0) to a predetermined large value. In other words, an increasing rate of the load should be small with respect to a increasing rate of the angle. Then, in torsion angle area over said predetermined value, the increasing rate is required to increase once or twice like a bent line. Therefore, in the conventional construction, a hub flange, a clutch plate and a retaining plate should have circumferentially long openings in which torsion springs are engaged. However, length of the openings have already increased to approximately maximum limit with respect to torque capacity and space allowed in the disc.

SUMMARY OF THE INVENTION

Accordingly, it is an object of the invention to provide an improved clutch disc, overcoming the above-noted disadvantage, wherein a maximum torison angle is increased and various intended torsion characteristics can be obtained easily.

Other and further objects, features and advantages of the invention will appear more fully from the following description of the preferred embodiments of the invention.

DETAILED DESCRIPTION OF THE PREFERRED EMBODIMENT

Figure 1:
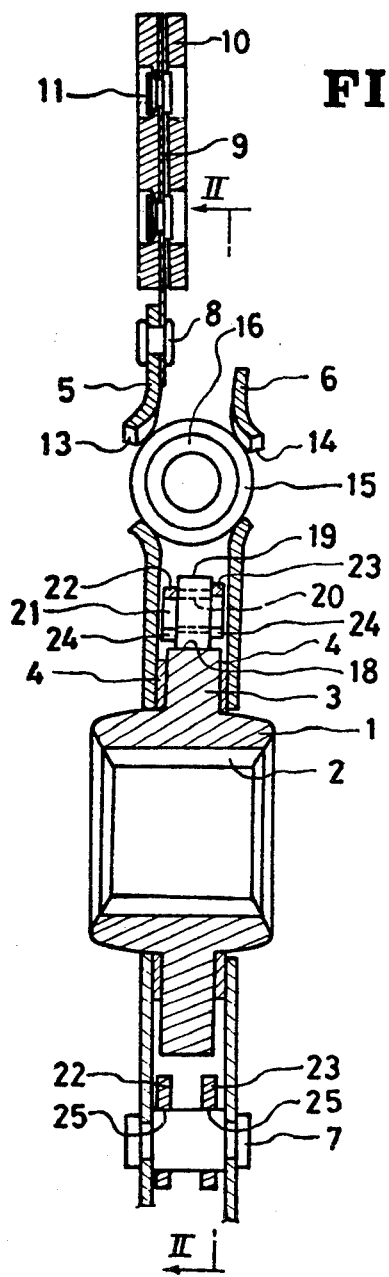
FIG. 1 is a longitudinal section view of a clutch disc according to the invention.
Figure 2:
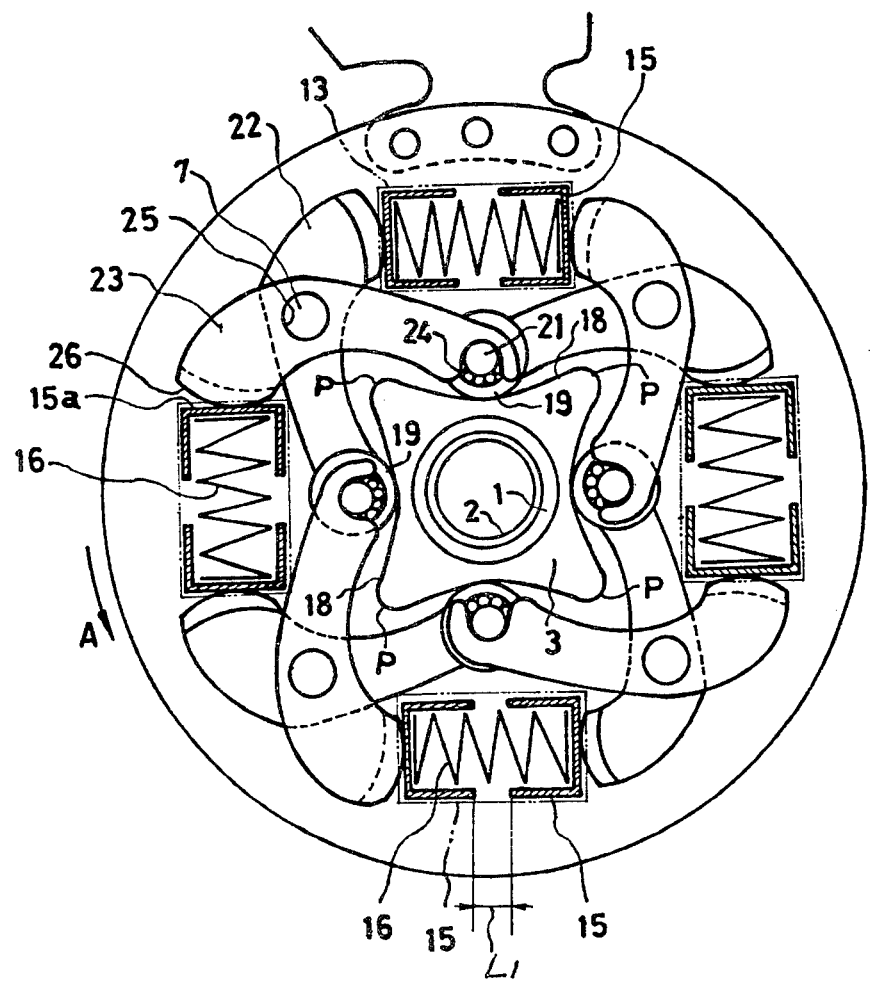
FIG. 2 is schematic section view taken along line II—II of FIG. 2.

Referring to FIG. 1, a spline hub 1 has inner spline teeth 2 splined to an output shaft (not shown) and a integral cam flange 3 at its outer periphery. The cam flange 3 has, as shown in FIG. 2, a polygonal shape having round corners and concave side faces. As shown in FIG. 1 an annular clutch plate 5 and an annular retaining plate 6 are arranged at both sides of the flange 3 with friction washers 4 therebetween. Both plates 5 and 6 are connected together by four lever pins 7 arranged on a common circumference with equal spaces therebetween, and are pressed to both side faces of the cam flange 3 through the friction washers 4 with relatively small pressure. Plural cushioning plates 9 are fixed to a radially outer portion of the clutch plate 5 by rivets 8. A pair of friction facings 10 are fixed to both faces of the cushioning plates 9 by rivets 11.

Each of the clutch plate 5 and the retaining plate 6 has four openings 13 and 14 arranged on a same circumference with equal spaces therebetween. Each pair of the openings 13 and 14 are axially aligned. Each of the openings 13 and 14 is circumferentially long and substantially rectangular, and is formed by a press. Compressed torsion springs 16 are arranged between pairs of spring caps 15, of which bottoms 15a (see FIG. 2) are in contact with or faced to circumferentially end edges of the openings 13 and 14.

Figure 3:
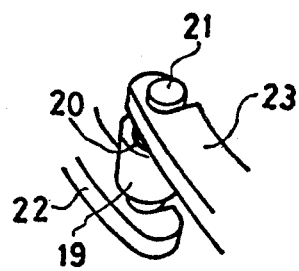
FIG. 3 is a perspective partial view of a roller means in FIG. 2.

Rollers 19 are in contact with cam faces 18 formed by the outer periphery of the cam flange 3. Each roller 19 supports a pin 21 through a needle bearing 20 (FIG. 3). Both ends of each pin 21 project from the roller 19, and are engaged with recesses 24 (FIG. 2) formed at respective inner ends of levers 22 and 23. Each recess 24 is opened toward the center of the disc, and has a longer curvature radius than the pin 21, so that strong interference between the recess 24 and the pin 19 may be prevented during operation of the levers 22 and 23.

The levers 22 and 23 are substantially L-shaped, and have the same bel-crank-like shape. The lever pin 7 is rotatably fitted into holes 25 formed in intermediate portions of the levers 22 and 23. The levers 22 and 23 have said recesses 24 at one end and have arc faces 26 at their outer ends, which are in contact with or pressed against the bottoms 15a of the spring caps 15. Slight increase of circumferential length of the openings 13 and 14 increases the pressure of the arc faces 26 against the cap bottoms 15a. In each pair of the levers 22 and 23 supported by the one pin 7, the two arc faces 26 are seated on the bottom 15a of the adjacent two caps 15 respectively, and the two rollers 19 are seated on the adjacent two arc cam faces 18 (see FIG. 2). Each cam face 18 has a substantially arc shape opened radially outward with respect to the center of the clutch disc, and the distance (cam lift) from the above center of the face 18 is shortest at the circumferentially middle portion of the face 18. The adjacent cam faces 18 are continuous through round tops P.

Figure 4:
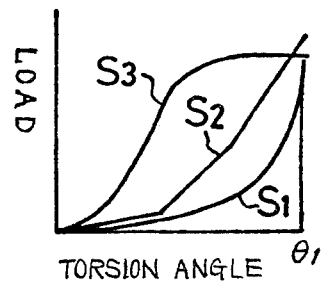
FIG. 4 is a graph showing load—torsion angle characteristic.

In the operation, when the friction facings 10 arranged at the outer portion of the disc are pressed to a flywheel (not shown) of an engine by a pressure plate (not shown) in a clutch casing, rotational force is transmitted to the friction facings 10, and then transmitted to the clutch plate 5 and the retaining plate 6 through the cushioning plates 9, whereby the plates 5 and 6 start to rotate in a direction of an arrow A in FIG. 2. Since the lever pins 7 fixed to the plates 5 and 6 rotate in the same direction of the arrow A, rollers 19 roll and travel on the respective cam faces 18 in the direction of the arrow A, so that the levers 22 and 23 are lifted by the faces 18, and compress the torsion springs 16 through the end arc faces 26 and the cap bottoms 15a. Thus, the rollers 19 are strongly pressed to the cam faces 18, and transmit the rotational force to the cam flange 3. Since the illustrated cam faces 18 have arc shapes opened radially outward, load applied to the springs 18 changes as shown in curve S1 in FIG. 4 with respect to increase of relative torsion angle between the cam flange 3 and the plates 5 and 6. When the plates 5 and 6 torsionally rotate or twist with respect to the flange 3, the friction washers 4 cause hysteresis (not shown) in the curve S1 in FIG. 4. The characteristic of the curve S1 is determined by the shape of the cam faces 18 (cam diagram). Therefore, various characteristics, e.g., S2 and S3 in FIG. 4, can be obtained by changing the cam shape. When the torsion angle increases to a maximum value, each pair of caps 15 contact with each other, so that the torsion springs 16 are not compressed any more. Thus the cam flange 3 and the plates 5 and 6 are connected together without further torsion. As apparent from the above, the spring caps 15 operate as stopper means, and the space L1 between a spring cap pair in a neutral position corresponds to stopper angle θ1.

As stated hereinbefore, the clutch disc comprises the spline hub 1 provided with the substantially polygonal cam flange 3, the clutch plate 5 and the retaining plate 6 with the cam flange 3 therebetween, the plural lever pins 7 arranged on the same circumference and connecting the plates 5 and 6 together with a space therebetween, the levers 22 and 23 of which the intermediate portions thereof are supported by the lever pins 7 respectively, the rollers 19 supported by respective inner ends of the levers 22 and 23, and the torsion springs 16 which engage with and press the respective outer ends of the levers 22 and 23 so that the rollers 19 may be pressed against the cam faces 18 of the cam flange 3. Therefore, the maximum torsion angle substantially corresponds to the length of each cam face 18 and can be increased. More concretely, according to the illustrated embodiment, wherein the cam flange 3 has a regular squarelike shape having four cam faces 18 of the same shape, the large torsion angle of 45° in the positive and negative directions can be obtained in theory, and a large torsion angle of approximately 40° can be obtained in practice, because the space L1 corresponding to said maximum angle is slightly reduced by the spring caps 15 used as stopper means. Various torsion characteristics can easily be obtained by changing the shape of the cam faces 18.

In one modification of the invention, the space L1 may be increased so that the caps 15 may not operate as the stopper means. The disc according to this modification can be used as a torque limiter. Namely, when the torque exceeds a predetermined value, each roller 19 passes over the round top P and moves onto the adjacent cam face 18, thus excessive force is not transmitted to the hub 1.

The friction washers 4 causing the hysteresis torque may be eliminated. In the disc without the washers 4, since the hysteresis torque is caused only by friction between the rollers 19 and the cam faces 18, such preferable characteristic can be obtained that the hysteresis torque increases substantially in accordance with the increase of the load or transmitted torque. Namely, in such characteristic, since the hysteresis torque is very small while the torsion angle is small, teeth-attack-noise can effectively be prevented during idling driving in which large torque vibration is produced.

In another modification of the invention a trianglelike cam flange may be employed.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed:

1. A clutch disk comprising:
   a spline hub having a cam flange of polygonal shape having concave cam faces at its outer periphery;
   a clutch plate and a retaining plate arranged at the sides of said cam flange;
   a plurality of lever pins fixing said clutch plate and said retaining plate together with a spece therebetween, said pins each being positioned radially outward from a corner of said polygonal cam flange and on a common circumference;
   a plurality of rollers, one of said rollers pressing against each face of said cam flange;
   a plurality of torsion springs arranged axially circumferentially between said clutch plate and said retaining plate, each of said springs being positioned radially outward from a face of said polygonal cam; and
   a plurality of substantially L-shaped levers supported at an intermediate position by said lever pins, each of said levers having an outer end pressed against an end of one of said springs and an inner end engaged with one of said rollers, and being so arranged that their inner ends are urged radially outwardly by rotation of said cam face with respect to said rollers whereby their outer ends apply circumferential torsion pressure against said springs.

2. A clutch disc a claimed in claim 1 wherein two of said levers are supported on each of said lever pins.

3. A clutch disc as claimed in claim 1, further comprising spring caps positioned on both ends of said torsion springs and arranged to contact each other at a maximum torsion angle to thereby function as a stopper means.

4. A clutch disc as claimed in claim 1 wherein the corners of said polygonal cam constitute the top of said cam and are rounded, and said levers are arranged so that said rollers can pass over said rounded cam corners, whereby said torsion pressure will not exceed a predetermined value.

5. A clutch disc as claimed in claim 1 wherein said cam flange has four concave cam faces.

6. A clutch disc as claimed in claim 2 wherein each of said springs has its opposite ends pressed against the outer ends of different levers, the inner ends of said levers being engaged with rollers on different faces of said cam flange.

* * * * *